US005484495A

United States Patent [19]

Moore

[11] Patent Number: 5,484,495

[45] Date of Patent: Jan. 16, 1996

[54] METHOD FOR CARVING WOOD ACCURATELY, ARTISTICALLY, AND IN A TIME EFFICIENT MANNER

[76] Inventor: John E. Moore, 326 E. 1900 North, Provo, Utah 84604

[21] Appl. No.: 282,662

[22] Filed: Jul. 29, 1994

[51] Int. Cl.[6] ........ B32B 31/00

[52] U.S. Cl. ........ 156/62; 33/563; 33/566; 144/144 R; 144/144.5 R; 144/329; 156/247; 156/625.1; 156/630.1; 434/88

[58] Field of Search ........ 434/88; 409/125, 409/130; 33/563, 564, 566, 562, 565; 156/62, 247, 625, 630, 660

[56] References Cited

U.S. PATENT DOCUMENTS

| | | | |
|---|---|---|---|
| 1,429,445 | 9/1922 | Merritt | 156/62 |
| 1,869,839 | 8/1932 | Boulard | 156/62 |
| 4,274,459 | 6/1981 | Galajda | 144/144 R |
| 4,470,197 | 9/1984 | Pagalies | 33/562 |
| 4,604,062 | 8/1986 | Woods | 434/88 |
| 4,781,230 | 11/1988 | Haug | 144/372 |
| 4,965,943 | 10/1990 | Adams | 144/144.5 R |
| 4,992,120 | 2/1991 | Badura | 156/62 |

FOREIGN PATENT DOCUMENTS

| | | | |
|---|---|---|---|
| 4106000 | 4/1992 | Japan | 156/62 |
| 419362 | 11/1934 | United Kingdom | 156/62 |
| 2022026 | 12/1979 | United Kingdom | 156/62 |

*Primary Examiner*—W. Donald Bray
*Attorney, Agent, or Firm*—Foster & Foster; Lynn G. Foster

[57] ABSTRACT

A method for carving wood is disclosed which uses a synthetic resinous adhesively backed film template for accurate, artistic and time efficient production of carvings.

6 Claims, 3 Drawing Sheets

METHOD FOR CARVING WOOD ACCURATELY, ARTISTICALLY, AND IN A TIME EFFICIENT MANNER

FIELD OF INVENTION

The present invention relates generally to the field of wood carving and more particularly to a method by which detailed carvings can be accurately and artistically produced in a time efficient fashion.

BACKGROUND

In the past it has been a common practice for those wishing to carve an artistic design in the exposed surface of a piece of wood to first spend an inordinate mount of time manually drawing the pattern to be carved directly upon the face of the wood workpiece. This problem is greatly exacerbated when the pattern is highly complex and involved. Frequently, hours, days and weeks are used to produce the hand drawn pattern on the surface of the wood, prior to initiating the carving step.

It has also been, in the past, a practice to obtain a pre-existing pattern or design to be carved and to reproduce that pattern using a photocopy machine. The photocopied pattern is thereafter glued to the exposed surface of the wood workpiece, following which the carving will occur on the workpiece through the glued photocopied pattern. Primary disadvantages of this approach have been distortion, imprecision, and inaccuracies introduced during application of the photocopied pattern to the workpiece and the transference of the glue or adhesive by which the pattern photocopy is adhered to both the wood and the carving instrument. Often, the result is a contaminated as well as an inaccurate carving.

BRIEF SUMMARY AND OBJECTS OF THE INVENTION

In brief summary,, the present invention overcomes or substantially alleviates the problems of inaccuracy, inartistry, and inefficiency associated with the wood carving art, especially the chip carving art and the incise carving art. Accordingly, the present invention comprises a method for carving wood in an accurate, artistic, and time efficient manner using a synthetic resinous adhesively backed film template.

With the foregoing in mind it is a primary object of the present invention to provide a novel method by which problems of the wood carving art are either solved or substantially alleviated.

An additional paramount object of the present invention is the provision of a novel method for carving wood accurately, artistically, and efficiently.

It is another material object to provide a novel method for carving wood using a synthetic resinous adhesively backed film template.

These and other objects and features of the present invention will be apparent from the detailed description taken with reference to the accompanying drawings.

DETAILED DESCRIPTION OF THE ILLUSTRATED EMBODIMENTS

Figure 1:
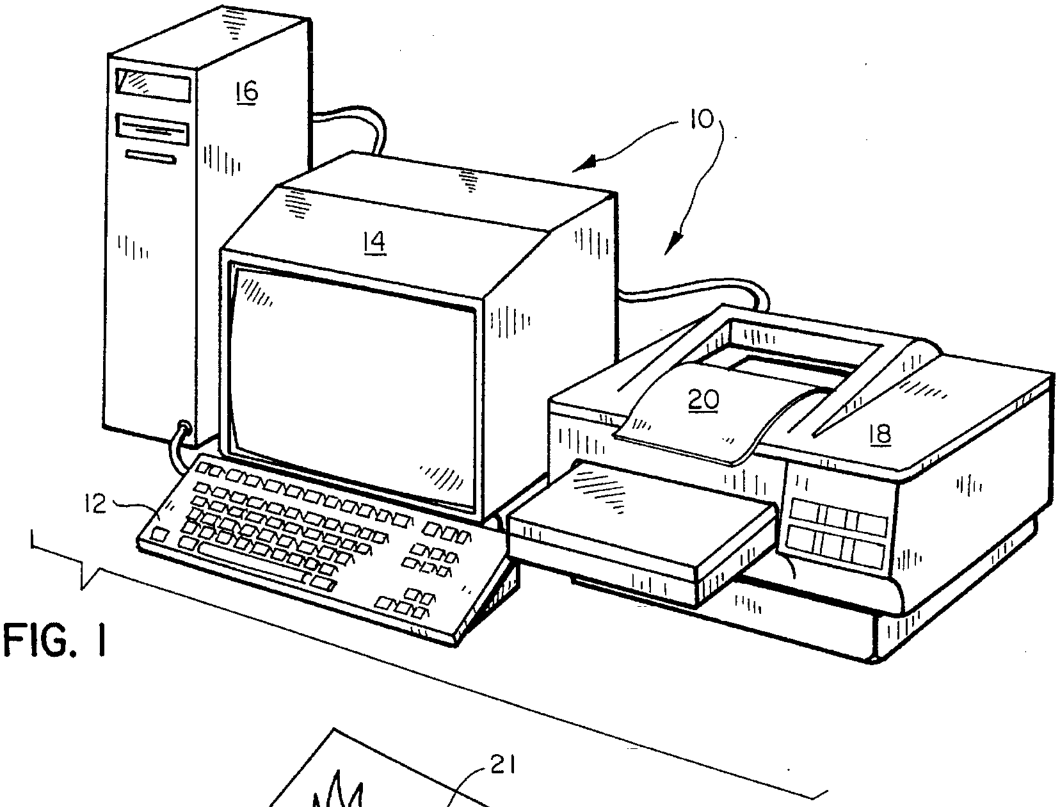
FIG. 1 is a perspective diagrammatic representation of a computer system by which sheets depicting designs or patterns to be carved in wood are generated.
Figure 2:
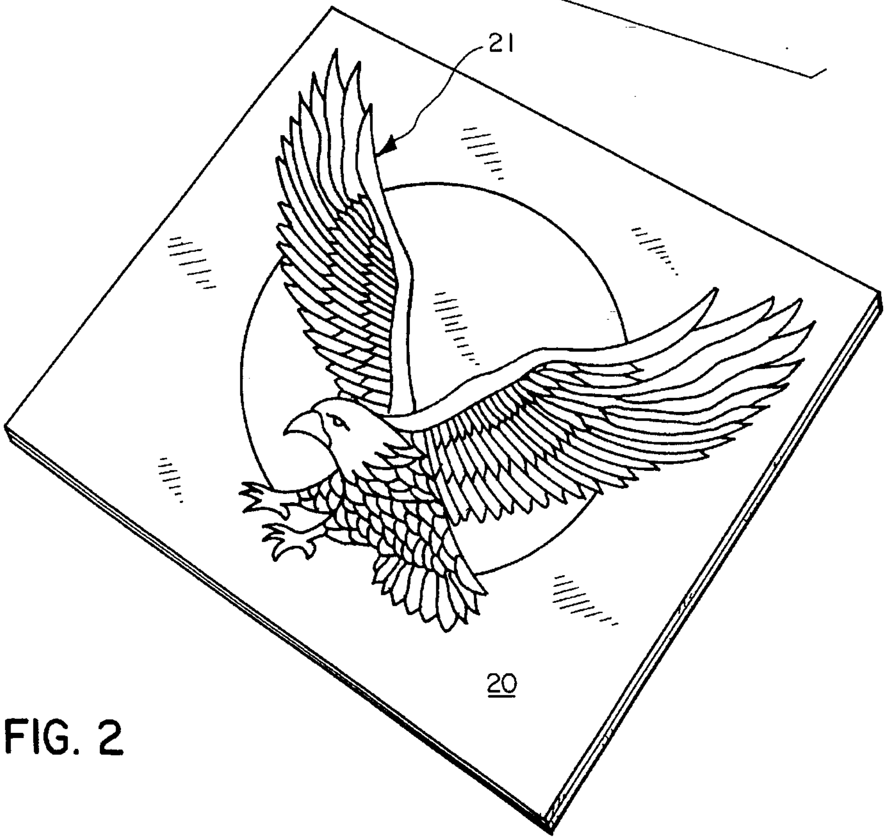
FIG. 2 is a perspective representation of a computer generated pattern, design or image superimposed upon a sheet of paper and intended to ultimately be placed upon a wood workpiece as an aid in carving the design upon the workpiece.

Reference is now made to the drawings wherein like numerals are used to designate like parts throughout. Specifically, FIG. 1 illustrates a computer system, generally designated 10, comprising conventional components, i.e., a keyboard 12, a display 14, a memory and circuitry component 16, and a printer 18. All of the components of the computer system 10 are conventional. The computer system 10 is also preferably equipped with commercially-available CAD program by which any one of many designs, patterns or images for use in carving may be generated, such as on a suitable sheet 20 illustrated as being discharged from printer 18. Accordingly, by use of the software and through implementation of keys on the keyboard 12, a desired design for carving can be selected and printed. A suitable design, pattern or image placed upon sheet 20 as an interim media is shown at site 21 in FIG. 1. The sheet 20 may comprise plotting vellum.

Through precise copying or printing techniques, the desired design 21 is transferred from the sheet 20 to a composite dual layer medium, generally designated 28. See FIGS. 3 and 4. The composite medium 28 comprises a removable backing layer 30 and a front layer 32 of transparent or translucent synthetic resinous film, such as Mylar, with adhesive on the reverse side of the front layer 32 at surface 34 (FIG. 4). The pattern or design 21 (FIG. 4) is imprinted upon the exposed surface 36 of the film layer 32. A suitable commercially available medium 28 is Repro Film available from Rayven, Inc., 431 North Griggs Street, St. Paul, Minn. 85104.

Figure 3:
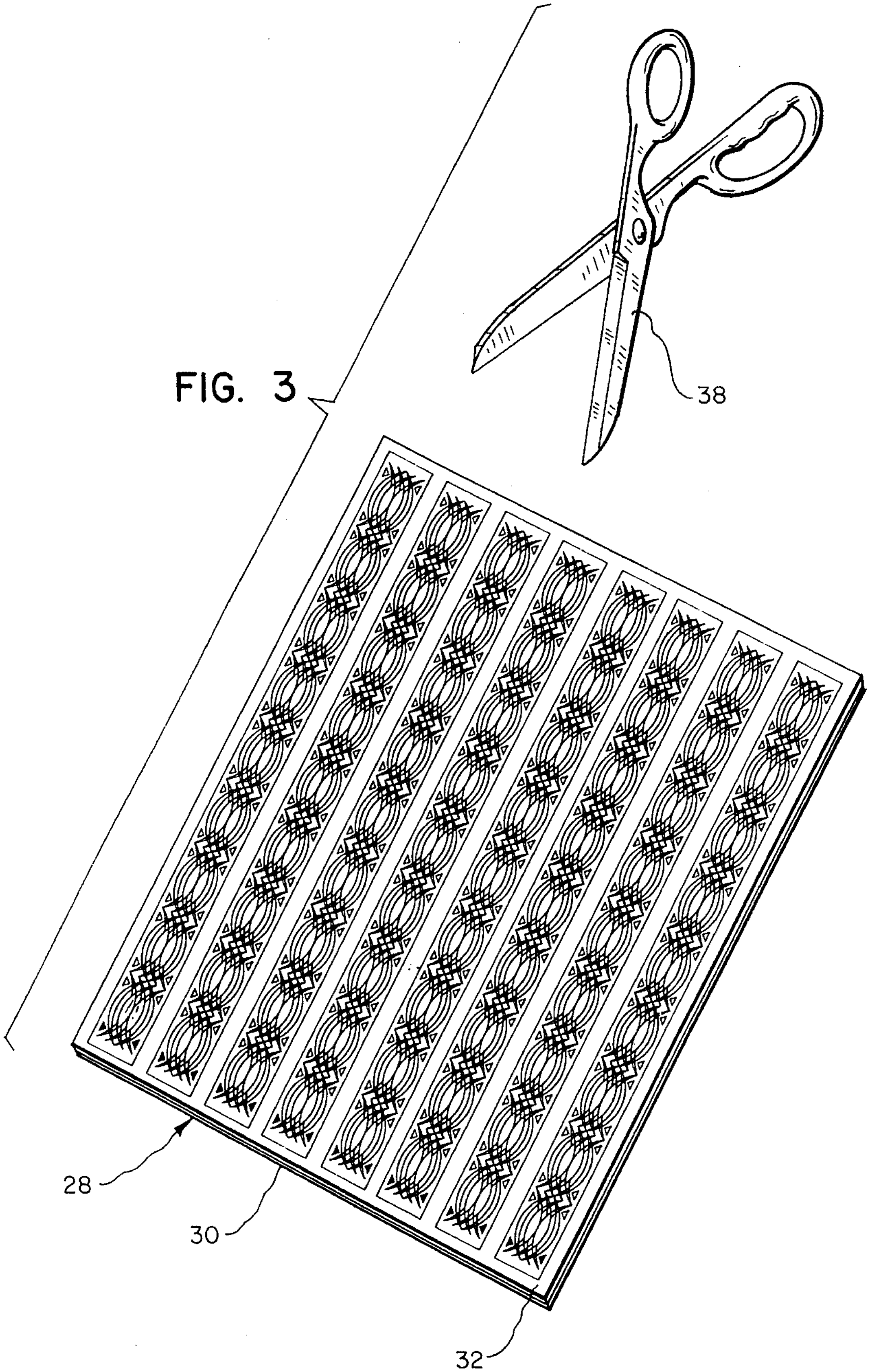
FIG. 3 is a perspective representation of a second computer generated pattern, design, or image primed or copied onto a specialized transparency or translucency comprising a rear adhesive layer over which a peel-away backing is disposed.
Figure 4:
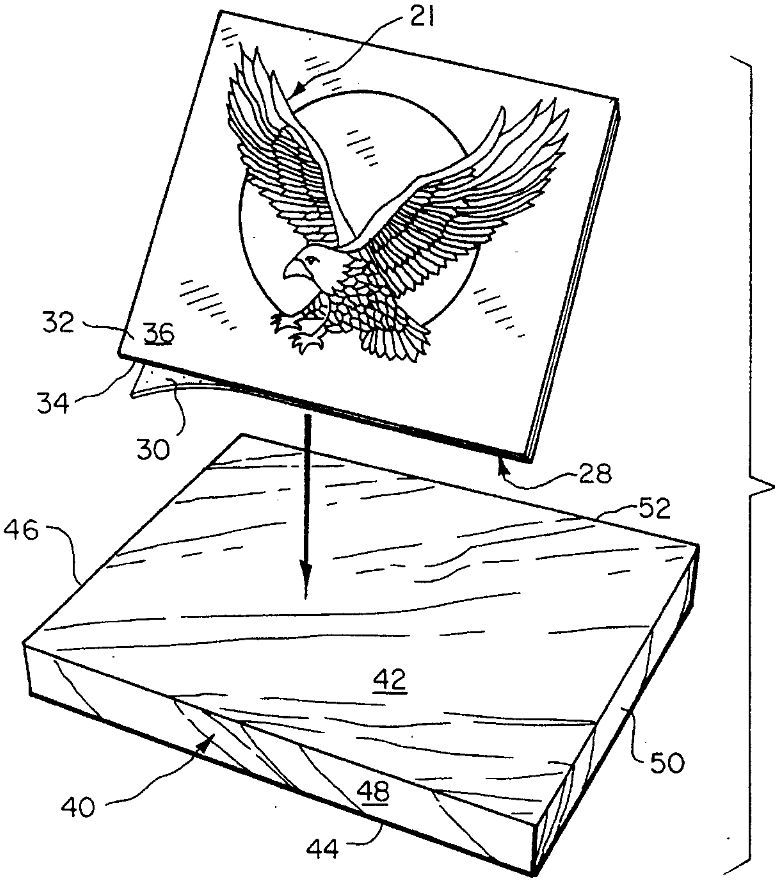
FIG. 4 is an exploded perspective illustrating a wooden workpiece upon which an image-carrying transparency or translucency sheet is to be placed and adhesively secured after the peel-away backing is removed and discarded.

While with some designs, as with pattern 21, a single rectangular piece of the medium 28 may be used in its entirety in conjunction with a wood workpiece as a carving aid, cut strips or pieces, depicting desired designs, may be cut from a given medium strip 28, as is illustrated in FIG. 3, using a pair of scissors 38 or other suitable cutting instrument. Strips or pieces from several different designs superimposed upon several different medium strips 28 may be placed and arranged upon a desired wood workpiece and used as templates through which a knife or other cutting instrument is inserted and subsequently displaced along the image lines during the carving operation, usually twice along each line to create a V in the wood.

As part of the process, the carver selects a suitably-sized wood workpiece 40 (FIG. 4) comprising, as illustrated, a flat top surface 42, a flat bottom surface 44, and edge surfaces 46, 48, 50, and 52. While illustrated as being flat and rectangular, any suitably configurated wood workpiece can be used including those of shapes other than rectangular and ones which are contoured.

Figure 5:
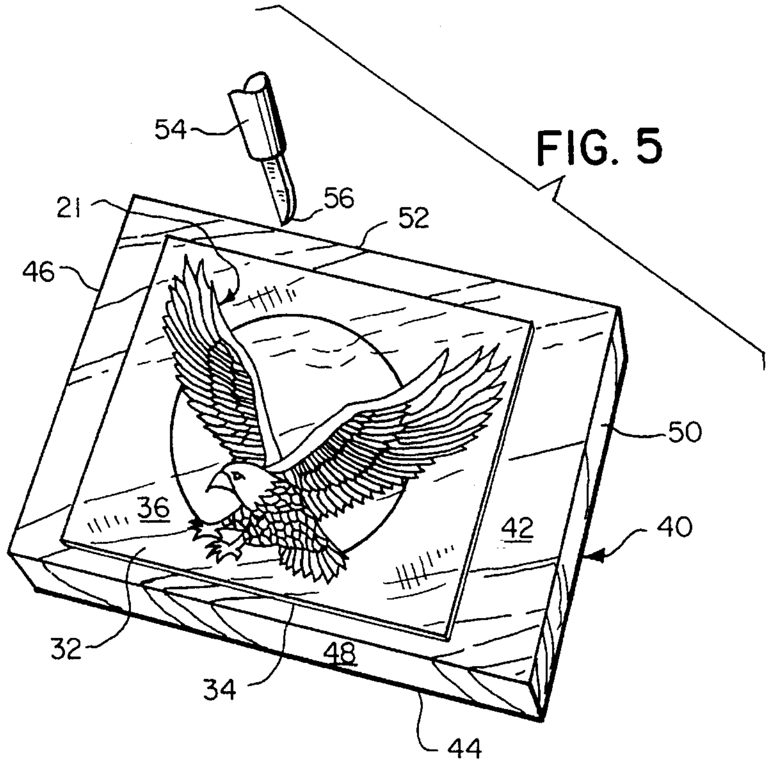
FIG. 5 is a perspective representation showing the transparency or translucency of FIG. 4 adhesively secured to a surface of the wood workpiece and a carving knife ready for use in carving the design or image of the transparency or translucency into the adjacent surface of the wood workpiece.

With continued reference to FIG. 4, with the image 21 carded at the exterior surface 36 of film layer 32 and with wood workpiece 40 or a similar workpiece available, the backing 30 is peeled away from the dual layer medium 28, as shown in part in FIG. 4, thereby exposing the adhesive on the reverse side 34 of the film 32. Thereafter, the layer of film 32 is superimposed over the surface 42 of the workpiece 40 in a suitable orientation, which may include but is not limited to offset alignment between the respective edges of the sheet 32 and the wood workpiece 40. This position is illustrated in FIG. 5. Typically, with the film 36 in the position illustrated in FIG. 5, the carver will press the film 32 and cause it to become smooth by moving the hands back and forth along the surface 36 to eliminate wrinkles and bubbles and to cause the adhesive at surface 34 to firmly and contiguously adhere to the surface 42. The pressure may be applied with the user's fingers, with a roller or in any other suitable way.

The carver, holding a knife or other carving instrument 54 (FIG. 5) will cause the knife edge 56 to penetrate the adhered layer 32 and to cut along the lines of the image 21 through the film 32 and a desired distance into the body of the wood workpiece 40 at surface 42. Most experienced carvers recommend that the cutting process begin at the interior center of the image and continue progressively toward the outside successively in the several necessary directions until the image of the template sheet 32 has been cut into the workpiece 40 through surface 42. Normally, the knife or other cutting instrument 54 is held at an acute angle in respect to the plane containing film 33. In other words, the knife is held in the hand in a sloped, diagonal, non-vertical direction, when each cut through the film 32 and into the wood is made.

It has been found that the film 32 does not fray, or separate from the wood surface 42 during the carving process, even when the lines cut through the film 32 into the wood are closely spaced and/or merge. The film 32 forms an ideal template which significantly aids the carver in accurately, artistically, and efficiently producing a wood carving of high quality. The adhesive on surface 34 does not transfer to the wood, nor does it accumulate on the knife along or adjacent the cutting edge 56. When the carving through the template 32 has been completed, the carver simply manually peels the remainder of the film 32 from the surface 42 of the wood workpiece 40 and discards the same leaving no residual pieces of the template 32 and no residual adhesive.

The invention may be embodied in other specific forms without departing from the spirit of essential characteristics thereof. The present embodiments therefore to be considered in all respects as illustrative and are not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of carving wood comprising the steps of:

providing a wood workpiece comprising at least one smooth uncarved surface for carving;

placing an adhesively backed film of synthetic resinous material carrying lines collectively comprising an image in an adhered relation upon the surface of the wood workpiece;

manually inserting a cutting blade through the film into the wood and moving the inserted blade along image lines to cut through the film at the image and to carve the image in the wood through the film;

de-adhering residual film from the wood surface and discarding the de-adhered residual film.

2. A method of carving wood comprising the steps of:

placing a desired image comprising an array of lines on a transparent or translucent sheet of adhesively backed synthetic resinous film;

removing a barrier layer from the sheet of film to expose the adhesive;

adhering the sheet of synthetic resinous film to uncarved surface of a wood workpiece;

cutting through the film into the wood along the image lines with a carving instrument to cut the image into the workpiece through the film;

removing and discarding the cut sheet of film from the wood.

3. A method according to claim 2 for the comprising step of deriving the image from computer-controlled software.

4. A method according to claim 2 wherein the adhering step comprises pressing the sheet of film firmly against the wood to enhance adhesion and contiguity.

5. A method according to claim 2 wherein the cuffing step comprises manipulating a hand-held knife.

6. A method according to claim 2 wherein the cutting step comprises displacing the carving instrument from an interior location within the image successively in an outward direction in respect to the image.

* * * * *